(12) United States Patent
Sporn

(10) Patent No.: US 6,237,539 B1
(45) Date of Patent: May 29, 2001

(54) MULTIPLE DOG LEASH

(76) Inventor: Joseph S. Sporn, 274 W. 86th St., New York, NY (US) 10024

( * ) Notice: Subject to any disclaimer, the term of this patent is extended or adjusted under 35 U.S.C. 154(b) by 0 days.

(21) Appl. No.: 09/309,775

(22) Filed: May 11, 1999

(51) Int. Cl.[7] .................................................. A01K 27/00
(52) U.S. Cl. ........................................... 119/795; 119/771
(58) Field of Search ..................... 119/769, 771, 119/792, 795, 797, 798

(56) References Cited

U.S. PATENT DOCUMENTS

| | | | |
|---|---|---|---|
| 4,879,972 | * | 11/1989 | Crowe et al. ......................... 119/792 |
| 5,551,379 | * | 9/1996 | Hart ...................................... 119/771 |
| 5,632,234 | * | 5/1997 | Parker .................................. 119/795 |
| 5,701,848 | * | 12/1997 | Tozawa ................................ 119/795 |
| 5,852,988 | * | 12/1998 | Gish ..................................... 119/795 |
| 5,901,668 | * | 5/1999 | Goodger, Sr. ........................ 119/795 |
| 6,029,611 | * | 2/2000 | Hershauer ............................ 119/771 |

\* cited by examiner

*Primary Examiner*—Charles T. Jordan
*Assistant Examiner*—Elizabeth Shaw
(74) *Attorney, Agent, or Firm*—Hopgood, Calimafde, Judlowe & Mondolino

(57) ABSTRACT

A multiple dog leash which makes it possible for a single individual to concurrently control at least two dogs that differ in size and therefore require leashes of different length. The multiple leash includes an elongated strap that passes through a coupling ring and is folded thereover to define two leash sections whose relative lengths depends on the site of the fold; a leash handle being linked to the coupling ring. Each leash section terminates in a connector that can be coupled to the collar or harness of a dog. Slidable along the two leash sections is a sleeve that acts to maintain these sections in parallel relation. Also slidable on the two sections between the sleeve and the connectors is a lockable clamp which after the strap is adjusted to create two leash sections having relative lengths appropriate to the dogs to which these sections are coupled, is then locked to maintain this relationship.

7 Claims, 2 Drawing Sheets

MULTIPLE DOG LEASH

BACKGROUND OF INVENTION

1. Field of Invention

This invention relates generally to dog leashes, and more particularly to a double dog leash which makes it possible for a single individual to concurrently control two dogs despite differences in their size and strength.

2. Status of Prior Art

A dog leash is a chain, a rope or a strap that is attachable to the collar or harness of a dog, the leash serving to lead the dog or to hold it in check. My prior Sporn U.S. Pat. Nos. 4,964,369; 5,329,885, 5,370,083 and 5,471,953, all disclose dog harnesses to which a leash is attachable, these harnesses being responsive to any strain on the leash to cause the dog to come to a halt.

Many cities in the United States have so called "leash laws" which make it illegal to permit a dog to run free outdoors without the restraint of a leash. When a family has a single dog, the need to leash this dog presents no problem. But quite a few families today have two dogs that differ in size and strength. Thus it is not uncommon for a family to have a large and strong watch dog whose main function is to guard the family, and a smaller and less powerful dog serving as a pet for the youngest child in the family.

Yet when these two dogs are taken outdoors for exercise or for other purposes, then both dogs must be leashed. This presents a problem when, as is often the case, a single individual is put in charge of both dogs. It is then necessary to provide each dog with a leash having a length appropriate to the size of the dog.

The single individual handling both dogs must grasp the handles of these two leashes, preferably in one hand, for then the two leashed dogs will be close to each other and not seek to run in different directions, as they might try doing had the leashes been held in separate hands.

When the two leashed dogs differ in strength to a significant degree, and their separate leash handles are held in one hand of the individual walking these dogs, should the stronger dog suddenly lurch ahead, in doing so its leash handle may be pulled out of the individual's hand, and the stronger dog will then be free to run away.

Thus a need exists for a double dog leash having a single handle that serves to control two dogs of different size and strength. A need also exists for a single handle multiple leash capable of concurrently controlling three or more dogs. In many cities in which multi-story apartment buildings house a multitude of dogs, it is now the practice to engage professional handlers to walk these dogs daily "en masse". Thus the handler may find himself holding in one hand the leash handles of three dogs, and holding in his other hand the leash handles of four dogs.

When this gang of dogs is well behaved, the handler then has no problem in walking them. But should one of the dogs act up, it may succeed in pulling away from the handler who does not have a firm grip on the several leash handles.

SUMMARY OF INVENTION

In view of the foregoing, the main object of this invention is to provide a multiple dog leash which has a common handle making it possible for a single individual to concurrently control at least two dogs that differ in size and therefore require leashes of different length.

A significant advantage of a multiple dog leash in accordance with the invention is that the pull exerted on the common handle is the collective force of the two or more dogs coupled to the leash, so that the individual in charge, by firmly grasping this handle can prevent any one of these dogs from escaping.

More particularly, an object of this invention is to provide a multiple dog leash of simple and inexpensive design that can be mass produced at low cost.

Briefly stated, these objects are attained by a multiple dog leash which makes it possible for a single individual to concurrently control at least two dogs that differ in size and therefore require leashes of different length. The multiple leash includes an elongated strap that passes through a coupling ring and is folded thereover to define two leash sections whose relative lengths depends on the site of the fold; a leash handle being linked to the coupling ring.

Each leash section terminates in a connector that can be coupled to the collar or harness of a dog. Slidable along the two leash sections is a sleeve that acts to maintain these sections in parallel relation. Also slidable on the two sections between the sleeve and the connectors is a lockable clamp which after the strap is adjusted to create two leash sections having relative lengths appropriate to the dogs to which these sections are coupled, is then locked to maintain this relationship.

BRIEF DESCRIPTION OF DRAWING

For a better understanding of the invention, as well as further features thereof, reference is made to the detailed description thereof to be read in connection with the annexed drawings wherein.

DESCRIPTION OF INVENTION

Figure 1:
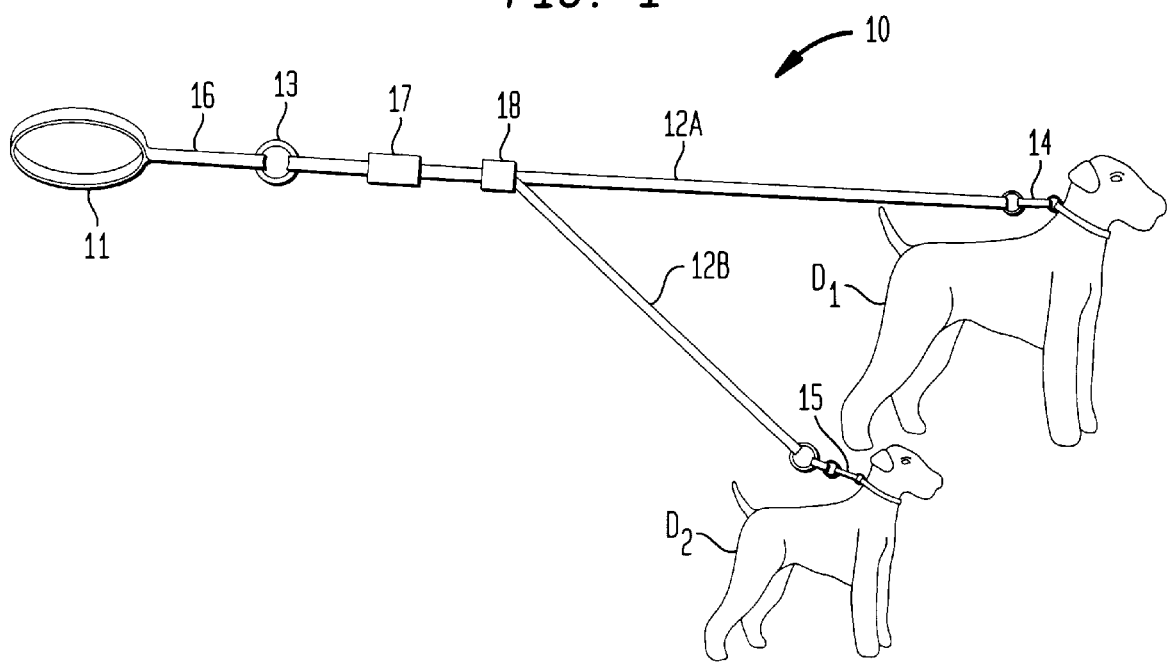
FIG. 1 illustrates a double leash in accordance with the invention coupled to two dogs of different size and strength.

Referring now to FIG. 1, there is shown a double leash in accordance with the invention, generally identified by reference numeral 10, which makes it possible for a single individual holding onto the loop handle 11 of the leash with one hand to concurrently control two dogs, dog $D_1$ being big and strong and dog $D_2$ being smaller and less powerful.

It is important to understand that the double leash is also useable with two dogs of about the same size and strength, as well as with two dogs that more or less differ in size and strength, for the pull exerted on the handle by the two dogs is the collective pull of both dogs. Hence the dog arrangement illustrated in FIG. 1 is only by way of example.

Figure 2:
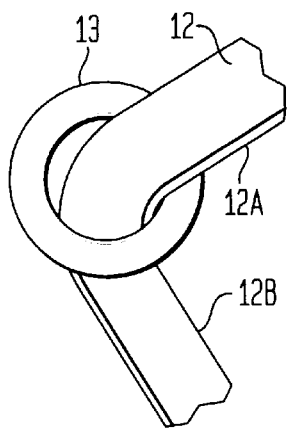
FIG. 2 shows a detail of the leash.
Figure 3:
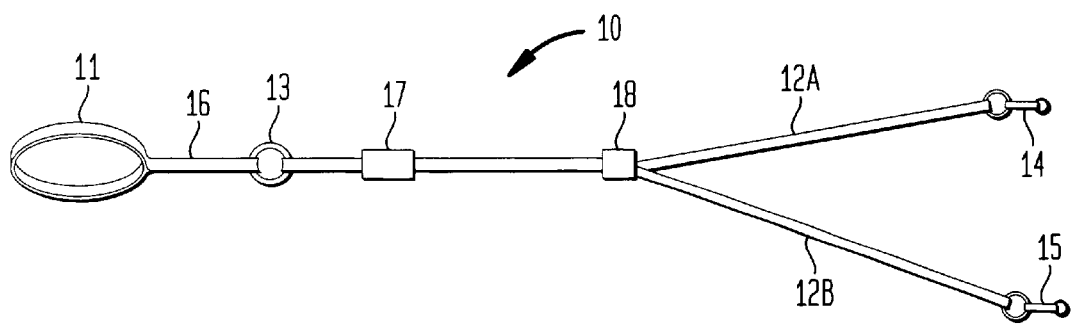
FIG. 3 illustrates the leash when adjusted to provide two leash sections of the same length.
Figure 4:
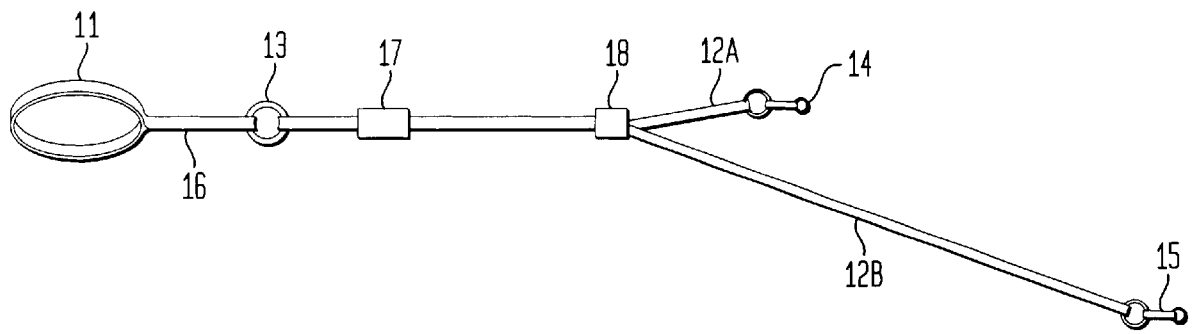
FIG. 4 illustrates the leash when adjusted to provide two sections, one long and the other short.

The main component of double leash 10 is an elongated strap 12 of woven fabric of high strength. As shown in FIG. 2, strap 12 passes through a metal coupling ring 13 and is folded thereover to define two leash sections 12A and 12B. The relative lengths of leash sections 12A and 12B depend on the site of the fold on coupling ring 13. The sections therefore may have equal lengths, as shown in FIG. 3, or have very different lengths, as shown in FIG. 4, in which case section 12B is much longer than section 12A.

Leash sections 12A and 12B terminate in collar connectors 14 and 15, respectively. These connectors are adapted to couple the leash sections to the existing collar or harness of the dog to be tethered by the leash.

Thus FIG. 1 shows the leash section connectors 14 and 15 coupled to collars encircling the necks of dogs $D_1$ and $D_2$. The common loop handle 16 of the double leash is formed by a short fabric strap, one end of which is folded over coupling ring 13 and stitched to form a small loop to link this strap to the ring. The other end of the short strap is folded over and stitched to create loop handle 16.

Slidable on leash sections 12A and 12B is a flexible plastic sleeve 17 which acts to maintain these sections in parallel relation regardless of their relative lengths. Also slidable on the leash sections between sleeve 17 and connectors 14 and 15 at the free ends of the leash sections is a lockable clamp 18.

After the strap 12 is adjusted with respect to coupling ring 13 to provide leash sections 12A and 12B whose relative lengths are appropriate to the two dogs to which these sections are connected, clamp 18 is then locked to maintain this relationship.

Thus in FIG. 1 since the dogs are of different size, leash section 12A coupled to the large dog $D_1$, is longer than leash section 12B which is coupled to the smaller dog $D_2$. But had the two dogs been of the same size, then the leash section 12A and 12B would be adjusted to have equal lengths, as shown in FIG. 3. In FIG. 4, the leash section 12A is much shorter than leash section 12B to accommodate a much smaller dog than the dog coupled to leash section 12B.

Slidable clamp 18 does more than just maintain the relative lengths of leash sections 12A and 12B, for the position of this clamp relative to the free ends of these sections determines the degree to which these sections can be spread apart by the dogs to which they are coupled.

Figure 5:
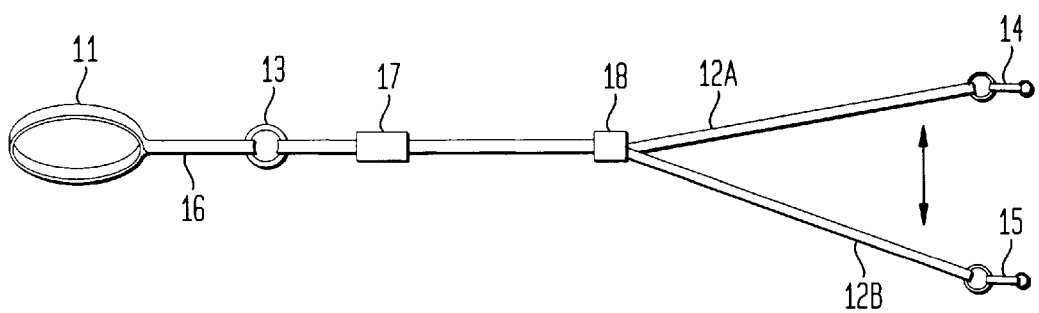
FIG. 5 shows the leash when adjusted to provide two sections of equal length that can be widely separated.
Figure 6:
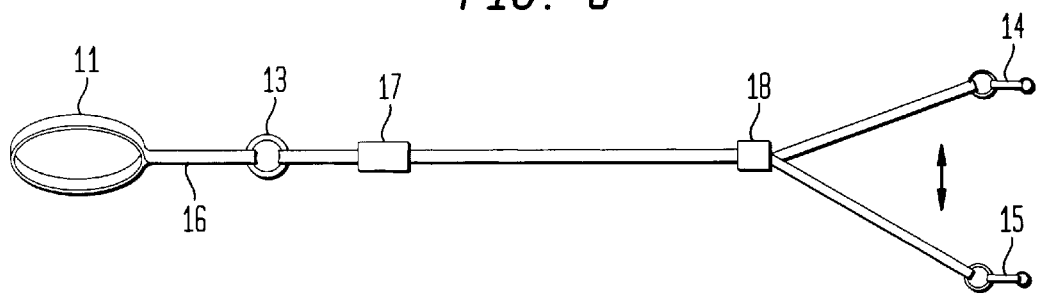
FIG. 6 shows the same leash as in FIG. 5 except that it is adjusted so that the two sections can only be narrowly separated.

Thus FIG. 5 shows the locking clamp 18 fairly distant from the free ends of leash sections 12A and 12B, thereby permitting the dogs coupled to those sections a fairly wide walking range. But in FIG. 6, locking clamp 18 is close to the free ends of sections 12A and 12B, thereby affording the dog a much narrower walking range.

Thus a double leash in accordance with the invention, despite its simplicity and the fact that its structure is mainly composed of a single length of strap, is capable of being adjusted to accommodate dogs of different size and strength, and to permit the dogs as much freedom as the individual holding the leash wishes to afford these dogs. In practice, the walking dogs may be brought close together by the double leash, or they may be given a fair amount of separation.

Figure 7:
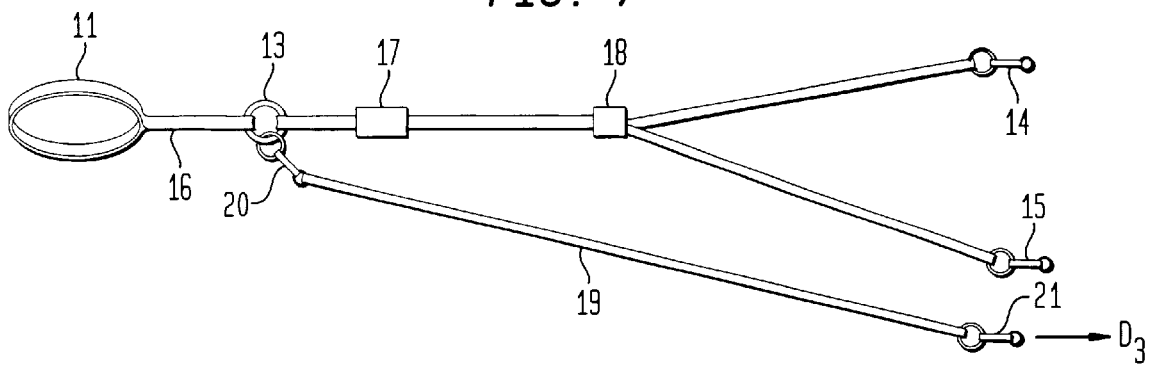
FIG. 7 shows an accessory for a double leash in accordance with the invention which makes it possible to couple a third dog to the leash.

A double leash in accordance with the invention may be modified to accommodate more than two dogs. For this purpose, as shown in FIG. 7, a tethering accessory is provided in the form of a fabric strap 19 having a retractable collar connector 20 to couple this end of the strap to coupling ring 13 of the double leash and having a like collar connector 21 at the other end to connect the accessory strap to the collar or harness of a third dog $D_3$.

In practice, additional accessories may be provided to accommodate still more dogs. But regardless of the number of dogs coupled to the multiple leash, the pull exerted by the dogs on the common handle of the leash is the collective pull of the several dogs. As long as the individual firmly grasps the common handle 16 in his hand, no dog tethered by the leash will be able to run away.

While there has been shown and described preferred embodiments of a multiple dog leash in accordance with the invention, it will be appreciated that many changes may be made thereon without departing from the spirit of the invention. Thus the double leash can be used to tether a single dog by making the two leash sections of equal length and coupling the connectors of this sections to the collar of the single dog.

I claim:

1. A multiple leash which makes it possible for a single individual to concurrently control at least two dogs that may differ in size and therefore require leashes of different length; said multiple leash comprising:

A. a coupling ring to which a handle is linked;

B. an elongated strap that passes through the ring and is folded thereover to define two leash sections whose relative lengths depend on the site of the fold on the ring; each leash section terminating in a connector that can be coupled to a collar or harness on a dog; and C. means to maintain the two leash sections extending from the ring in parallel relation; and D. a lockable clamp slidable on the parallel sections which after the strap is adjusted to create leash sections having relative lengths appropriate to the dogs to which these sections are coupled, is then locked to maintain this relationship.

2. A multiple leash as set forth in claim 1, in which the handle is formed by a short strap, one end of which is linked to the ring, the other end of which is folded over and stitched to create a loop handle.

3. A multiple leash as set forth in claim 1, in which the ring is formed of metal.

4. A multiple leash as set forth in claim 1, in which the elongated strap is formed of woven fabric.

5. A multiple leash as set forth in claim 1, in which the means to maintain the sections in parallel relation is a plastic sleeve.

6. A multiple leash as set forth in claim 1, further including at least one accessory that is attachable to the ring to tether a third dog thereto.

7. A multiple leash as set forth in claim 6, in which the accessory is formed by a strap having a connector at one end to couple the strap to the ring, and having a connector at the other end to couple the strap to a collar or harness on the third dog.

\* \* \* \* \*